United States Patent
Fong et al.

(10) Patent No.: US 7,492,737 B1
(45) Date of Patent: Feb. 17, 2009

(54) SERVICE-DRIVEN AIR INTERFACE PROTOCOL ARCHITECTURE FOR WIRELESS SYSTEMS

(75) Inventors: Mo-Han Fong, L'Orignal (CA); Geng Wu, Plano, TX (US); Hang Zhang, Nepean (CA); Jun Li, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1375 days.

(21) Appl. No.: 10/141,013

(22) Filed: May 8, 2002

Related U.S. Application Data

(60) Provisional application No. 60/293,387, filed on May 23, 2001.

(51) Int. Cl.
*H04Q 7/00* (2006.01)
(52) U.S. Cl. ............... 370/331; 370/467; 455/436
(58) Field of Classification Search ............ None
See application file for complete search history.

(56) References Cited

U.S. PATENT DOCUMENTS

| | | | |
|---|---|---|---|
| 6,049,528 A * | 4/2000 | Hendel et al. | 370/235 |
| 6,088,587 A * | 7/2000 | Abbadessa | 455/424 |
| 6,178,337 B1 * | 1/2001 | Spartz et al. | 455/561 |
| 6,278,701 B1 | 8/2001 | Ayyagari et al. | |
| 6,327,268 B1 * | 12/2001 | Sipila | 370/467 |
| 6,381,461 B1 * | 4/2002 | Besson et al. | 455/450 |
| 6,496,694 B1 * | 12/2002 | Menon et al. | 455/426.2 |
| 6,631,122 B1 * | 10/2003 | Arunachalam et al. | 370/332 |
| 6,748,220 B1 * | 6/2004 | Chow et al. | 455/450 |
| 6,772,112 B1 * | 8/2004 | Ejzak | 704/201 |
| 6,937,566 B1 * | 8/2005 | Forslow | 370/231 |
| 7,280,506 B2 * | 10/2007 | Lin et al. | 370/331 |
| 2001/0022784 A1 * | 9/2001 | Menon et al. | 370/352 |
| 2001/0043603 A1 * | 11/2001 | Yu | 370/393 |
| 2003/0174688 A1 * | 9/2003 | Ahmed et al. | 370/349 |
| 2003/0174731 A1 * | 9/2003 | Tafazolli et al. | 370/469 |
| 2004/0174851 A1 * | 9/2004 | Zalitzky et al. | 370/338 |
| 2005/0169228 A1 * | 8/2005 | Dowling | 370/342 |
| 2007/0183461 A1 * | 8/2007 | Eyal et al. | 370/503 |
| 2008/0192681 A1 * | 8/2008 | Lee et al. | 370/328 |
| 2008/0207253 A1 * | 8/2008 | Jaakkola et al. | 455/550.1 |

* cited by examiner

*Primary Examiner*—Firmin Backer
*Assistant Examiner*—Phuongchau B Nguyen
(74) *Attorney, Agent, or Firm*—Trop, Pruner & Hu, P.C.

(57) ABSTRACT

Disclosed is an air interface protocol architecture for a multi-carrier wireless communications network having a plurality of carriers. The protocol architecture comprises a common layer 2/3 protocol for each of the carriers. The common layer 2/3 protocol provides a common interface with wireline upper level protocols. In addition to the common layer 2/3 protocol, the architecture comprises a multimode physical layer for each of the carriers. The protocol architecture enables the physical layer of each carrier may have a different protocol configuration for each mobile station serviced by the carrier. Each air interface protocol instance includes one or more resource pools. The resource pools each includes: (1) a quality of service (QoS) supported; (2) a list of manageable resources; (3) a carrier identification; and (4) an air interface configuration. Additionally, the layer 2 protocol of the common layer 2/3 protocol includes one or more Radio Link Protocol (RLP) instances (or a QoS Link Protocol) and one or more Medium Access Control (MAC) sublayer instances.

26 Claims, 4 Drawing Sheets

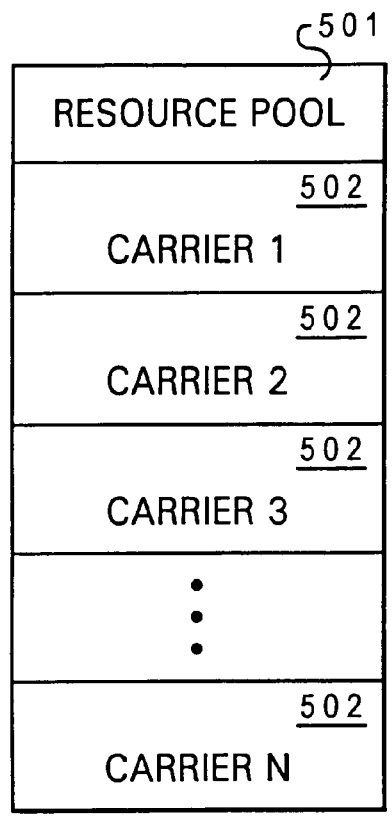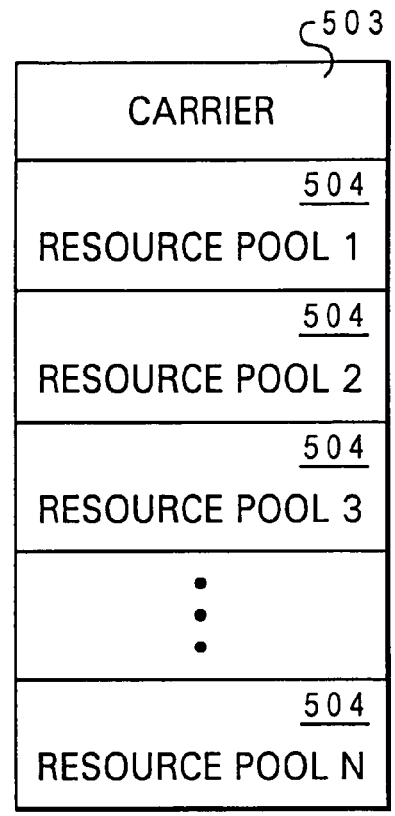
*Fig. 5A*   *Fig. 5B*
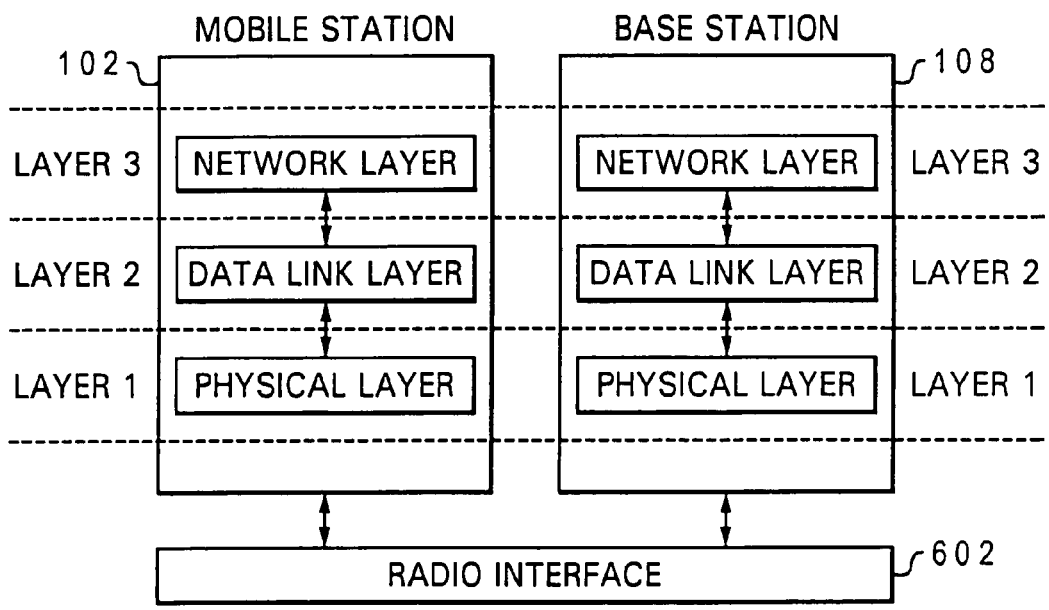
*Fig. 6* (PRIOR ART)

ic Field

The present invention relates generally to wireless systems and in particular to multi-carrier wireless systems. Still more particularly, the present invention relates to a method and system for implementing a service driven air interface protocol for multi-carrier wireless systems.

2. Description of the Related Art

Code Division Multiple Access (CDMA) cellular communications networks are commonly utilized to provide wireless communication service to mobile users. At its infancy, CDMA networks utilized a single frequency carrier to provide service to the mobile units, base stations, and other units in the service area. Substantial increases in the utilization of cellular communication equipment, such as wireless enabled laptop computers and Third Generation (3G) high rate mobile terminals, resulted in a need for even higher bandwidth (i.e., more frequencies) within the service area than could be supported by the single frequency carrier.

This need for higher bandwidth led to the development of a multi-carrier air interface. Multi-carrier networks utilize several different frequency ranges in the available frequency spectrum for wireless communication. Thus, a first frequency range is utilized for a first carrier, a second frequency range is utilized for a second carrier, and so on. Each carrier frequency has an associated capacity, which limits the total amount of traffic (i.e., the load) allowed on that carrier.

Traditionally, cellular telephone networks provided service for voice users only and did not address high-speed data (HSD) applications such as electronic mail, with large multimedia attachments, facsimile, image transmission, and FTP transfer.

The wireless industry has experienced increasing demands for wireless services include voice, real-time and delay tolerant data applications. For example, the Telecommunications Industry Association (TIA) TR-45.5 cellular CDMA standard committee has developed CDMA networks that can support high-speed data (HSD) along with conventional voice telephony. These different types of services typically have different Quality of Service (QoS) requirements.

With the increase of both voice and data traffic, multi-carrier deployments provide a practical way to handle increased traffic. However, efficient traffic distribution among multi-carrier frequencies have proven to be a hurdle for CDMA networks. Thus, the wireless industry is searching for the next generation CDMA systems that can provide a rich portfolio of services to its end users cost-effectively. A number of proposals have been submitted to different standards organizations worldwide for this goal. In particular, the Third Generation Partnership Project 2 (3GPP2) is currently developing a 1xEV-DV solution that will provide both voice and high speed data services in a single (1.25 MHz) spread spectrum carrier. Because of the bandwidth limitation, however, those systems that are being proposed in a single 1.25 MHz carrier will not satisfy the industry need in terms of the peak data rate offered, overall system capacity, as well as required cost-effective QoS solutions throughout the cell/sector coverage.

One reason for the limitation in the proposed solution is the current data communication protocol design utilized to implement most communication networks including wireless networks.

FIG. 6 illustrates a protocol stack configuration. As shown, mobile station 102 communicates with base station 108 over a radio interface 602 by utilizing a series of communication protocols broken down into three distinct layers. Layer 1 of the protocol stack is the physical layer. The physical layer is concerned with the transmission of unstructured bit streams over a physical link, involving such parameters as transmit power, signal bit/chip waveform and so forth. In this illustration, the physical layer operates in accordance with IS2000 and its subsequent Layer 2 of the protocol stack is the data link layer. The data link layer provides the reliable transfer of data across the physical link, such as sending blocks of data with the necessary synchronization, error control, flow control, and so forth. As currently defined, IS2000 utilizes a radio link protocol defined by IS-707 for the data link layer operations. Layer 3 of the protocol stack is the network layer. The network layer provides upper layers with independence from the data transmission and switching technologies used to connect systems. The network layer is responsible for establishing, maintaining and terminating connections. In this embodiment of the invention, the network layer operates in accordance with any network layer protocol suitable for use with IS2000.

Particularly relevant to the actual transmission of packets are these lower layers, which include layers 2 and 3 that interact with the physical layer (i.e., the underlying radio connection) to transmit and receive communication between the mobile device and base stations. The particular carriers available are defined within these protocol layers and are utilized during the communication. For example, in the conventional multi-carrier system, e.g. 3xRTT, the mobile device always transmits/receives on a fixed number of carriers in a rigid manner. (i.e., the type of communication supported by each carrier cannot be changed). These systems cannot support dynamic switching and allocation of carriers because the layer 2 and 3 protocol design do not support flexible carrier(s) switching and allocation to satisfy different service requirements.

The present invention thus realizes that it would be desirable to provide a wireless system and protocol layer configuration that enables flexible carrier assignment and resource allocation. A wireless system and protocol configuration that supports dynamic and smooth transition from one physical layer configuration to another based on quality of service requirements, loading conditions, and channel conditions would be a welcomed improvement. It would be further channel conditions would be a welcomed improvement. It would be further desirable to provide a wireless system and protocol configuration that enables a mobile station to flexibly receive/transmit from/to different numbers of carriers at different time instants. These and other benefits are provided by the present invention.

SUMMARY OF THE INVENTION

Disclosed is an air interface protocol architecture for a multi-carrier wireless communications network. The protocol architecture comprises a common layer 2/3 protocol for each of the carriers. The common layer 2/3 protocol provides a common interface with wireline upper level protocols. In addition to the common layer 2/3 protocol, the architecture comprises a multimode physical layer for each of the carriers. The protocol architecture enables the physical layer of each carrier to have a different protocol configuration for each mobile station serviced by the carrier at a particular time.

The physical layer of the air interface protocol architecture includes one or more resource pools. The resource pools each defines: (1) a quality of service (QoS) supported; (2) a list of manageable resources; (3) a carrier identification; and (4) an air interface configuration. Additionally, the layer 2 protocol of the common layer 2/3 protocol includes one or more Radio Link Protocol (RLP) (or a QoS Link Protocol) instances and one or more Medium Access Control (MAC) sublayer instances.

In a network configuration, the air interface protocol architecture is provided for a multi-carrier wireless communications network, and comprises (1) a centralized layer 2/3 protocol implemented in the base station controller, (2) a distributed layer 2/3 protocol implemented in the base station subsystem controller, and (3) a plurality of physical layer configurations implemented in the base station subsystem modem.

The above, as well as additional objects, features, and advantages of the present invention will become apparent in the detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIGS. 5A and 5B are block diagram representations of a carrier with multiple resource pools and a resource pool that supports multiple carrier according to two illustrative embodiments of the invention; and FIG. 6 is a block diagram illustrating the protocol stack and air interface layers of a sample CDMA network.

DETAILED DESCRIPTION OF ILLUSTRATIVE EMBODIMENTS

Figure 1:
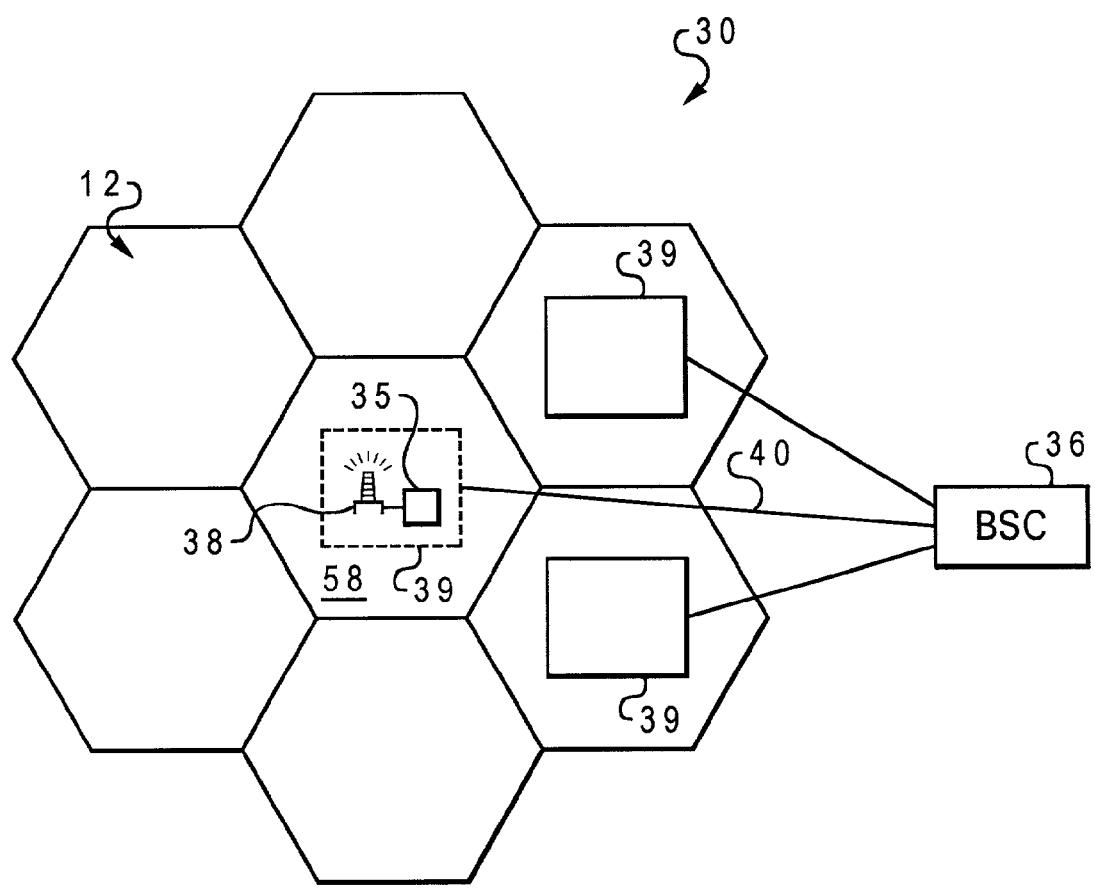
FIG. 1 is an example CDMA wireless communications network within which the features of the present invention may be implemented.

With reference now to the figures and in particular with reference to FIG. 1, there is illustrated a CDMA network within which the features of the present invention may advantageously be implemented. CDMA network 30 includes a plurality of cells 12. A representative cell 58 of CDMA network represents a fan-out area for propagation of signals from base station antenna 38 affiliated with base station 35. The combination of the base station 35 and its affiliated base station antenna 38 constitutes a base-station transceiver subsystem (BTS) 39. CDMA network 30 comprises a plurality of BTS. BTS 39 in representative cell 58 is connected to its base station controller (BSC) 36 over a backhaul link 40, which manages the communication processes of BTS 39. CDMA network 30 provides communication between one mobile unit (not shown) and another mobile unit or other communication unit via BTS 39. According to the embodiment described herein, CDMA network 30 is a multi-carrier network that supports at least two (2) carrier frequencies.

Figure 2:
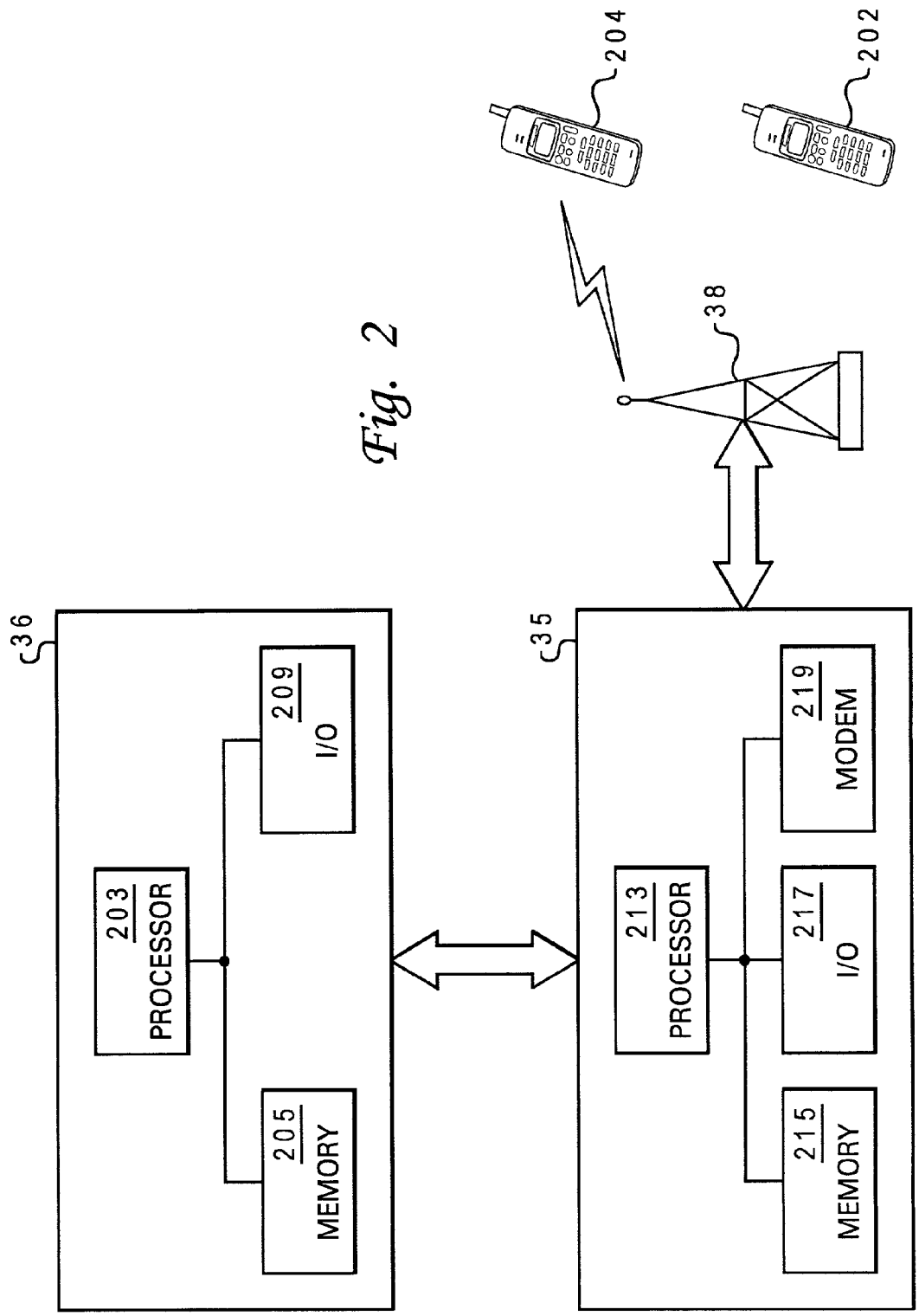
FIG. 2 is a block diagram illustrating the processing components associated with the base station in FIG. 1, which may be utilized to implement the various carrier and resource pool selection and assigning processes of the present invention.

FIG. 2 is a system level diagram illustrating various processing and communicating components within one communication path of CDMA network 30 of FIG. 1. Base station 35 provides radio communication with mobile unit 204, 202 via base station antenna 38. Consistent with the present invention, CDMA network includes voice and data users indicated by mobile unit 204 that implements this invention and mobile unit 202 that supports the existing CDMA2000 air interfaces commonly referred to as a legacy mobile in the industry.

FIG. 2 also illustrates an exemplary configuration of a data processing system of base station controller 36. A typical data processing system in the BSC comprises a processor 203 that controls (i.e., executes) the software coded operations of the present invention. Coupled to processor 203 are memory 205, and Input/Output (I/O) devices 209. During standard operation, this data processing system (which may be a component part of a router, switch, and/or switching center) controls/manages radio resource allocation and other communication features of CDMA network 30.

During traffic transmission or reception, access to a carrier frequency for completing a communication is controlled by base station 35. In a preferred embodiment, software coded features of the present invention are stored in memory 215 and executed on processor 213. Results generated from processor 213 during execution of the software code of the invention are then provided to modem 219, which operates to generate or receive the required radio signals. Air transmission of the traffic is completed via antenna 38 that is coupled to the base station 35.

The present invention provides a multi-carrier system within the above CDMA network structure that is capable of transmitting packets across a plurality of available carriers with high efficiency and flexibility. The multi-carrier system allows different physical layer configurations on different carriers. In order to support the above flexible carrier(s) assignment and resource allocation, the invention provides a service-driven protocol design with a common layer 2 and 3 that supports different physical layer modes of operations at different time instants and for different mobile devices/users (e.g., voice and data). The invention provides a new layer 2/3 design that enables dynamic switching and allocation of available carriers and smooth transition from one physical layer mode to another based on service requirement, loading conditions, and channel conditions.

Overall Protocol Structure

Key to the invention is the versatile service-driven protocol design, which consists of a common layer 2 and layer 3 within the protocol layers that supports multiple, inhomogeneous carriers and physical layer configurations.

The layer 2 protocol structure consists of the one or more Radio Link Protocol (RLP) instances and one or more Medium Access Control (MAC) sublayer instances. RLP provides transparent (i.e., no Automatic Request for Retransmission (ARQ)) or non-transparent (i.e., with ARQ) link layer data transmission error control. The layer 3 protocol defines a set of signaling messages and signaling flows that controls the overall air-interface operations.

In an alternative embodiment, a QoS Link Protocol (QLP) is utilized instead of RLP. QLP and its associated functionality are described in a related, commonly owned application, Ser. No. 10/141,268, filed May 8, 2002, now U.S. Pat. No. 7,200,154. The content of the related application is hereby incorporated by reference.

Figure 3:
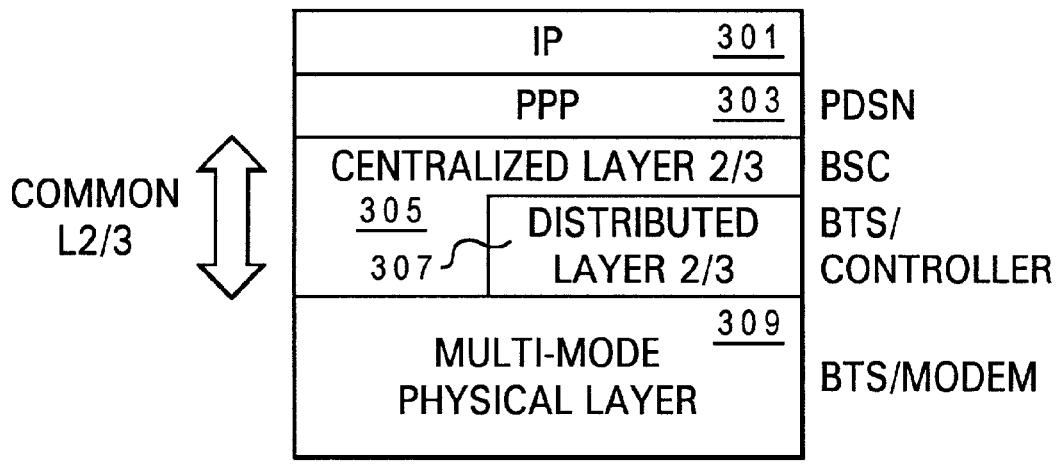
FIG. 3 is a block diagram representation of the protocol structure/configuration, which includes a common layer 2 and 3 according to one embodiment of the present invention.

FIG. 3 illustrates one possible implementation of the protocol structure for a high-speed multi-carrier wireless network according to the invention. Illustrated are centralized layer 2/3 305, distributed layer 2/3 307, and physical layer 309. In the present embodiment, centralized layer 2/3 305 is implemented in the base station controller (BSC), distributed layer 2/3 is implemented in the base station transceiver subsystem (BTS) and the different physical layer configurations are implemented in the modem of the BTS.

In the forward link, the physical layer resource assignment to each mobile station is performed according to the radio channel condition experienced in the forward link of the mobile station, as well as service requirements which are defined by upper protocol layers, i.e., air-interface protocol layer 2 and 3. The layer 2 and 3 protocols provide a common interface with the wireline upper layer protocols such as Point-to-Point Protocol (PPP) 303, Internet Protocol (IP) 301 and Transmission Control Protocol (TCP). The layer 2 and 3 protocols interface with the multi-mode physical layer by selecting the appropriate physical layer resource in both frequency domain and time domain to meet the Quality of Service (QoS) required by upper layer applications as well as the subscriber's profile. The invention is fully applicable to any multi-carrier protocol structure with a centralized layer 2/3 as described herein.

Consistent with the multi-carrier configuration of the network, the multi-mode physical layer 309 consists of 1 to N carriers, each of which can be configured differently in terms of modulation and coding schemes. Each of the carriers can also be configured differently in terms of the QoS (or the set of QoS) the carrier provides to the upper layers. The physical resource is divided into two domains: frequency domain in terms of carrier(s); and time domain in terms of time slots(s).

Layer 2/3 and Physical Layer Interface

Figure 4:
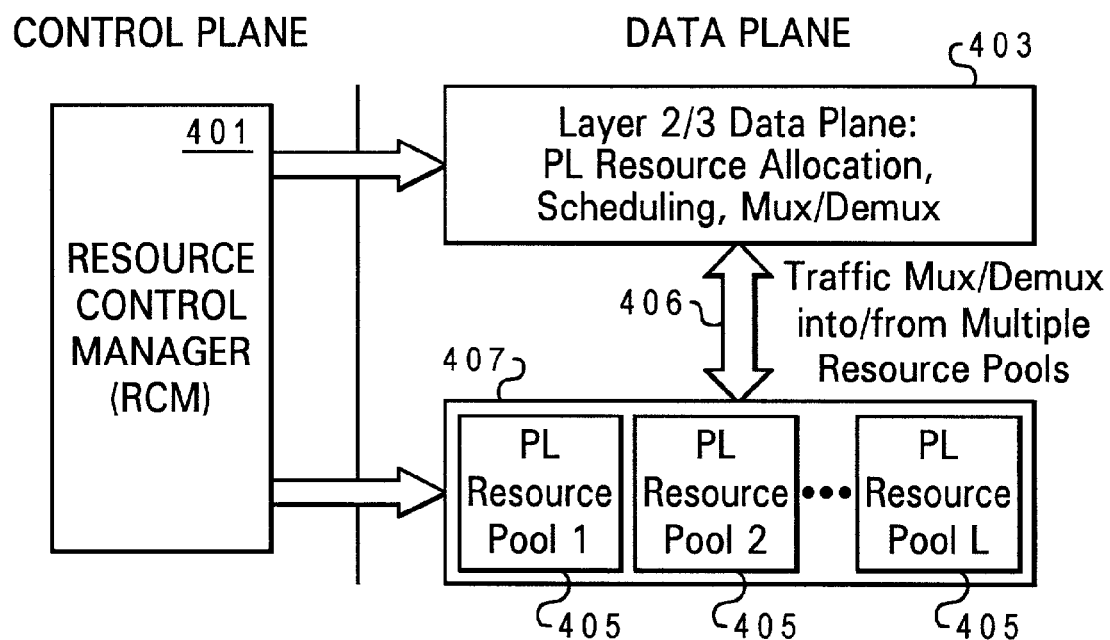
FIG. 4 is a block diagram illustrating the resource management interface between common layer 2/3, the resource pools, and the physical layer.

FIG. 4 illustrates the resource management interface between layer 2/3 and physical layer 309 of FIG. 3. Illustrated are the control plane and data plane. The control plane comprises a centralized resource control manager (RCM) 401. The data plane comprises layer 2/3 403 and physical layer 407. The data plane of the MAC sublayer provides dynamic multiplexing and de-multiplexing of layer 2 frames from one or more users or terminals to/from physical layer frames. In accordance with the invention, the control plane of the MAC sublayer consists of a MAC state machine per user or terminal.

The physical layer resource 407, as is presented to layer 2/3 403, consists of a set of resource pools 405. Each resource pool 405 is uniquely defined based on several parameters, which includes (1) quality of service supported, (2) list of manageable resources, (3) carrier identification, and (4) air interface configuration. The centralized RCM 401 performs call admission, slow quasi-static, time-of-day management of the pools' characteristics and boundaries.

The quality of service supported may include, but is not restricted to, data rate (minimum, maximum, and/or mean), packet loss rate, and service type such as real-time or delay tolerant service. The manageable resources are selected from among time slots, spreading codes, power, modulation and coding set, etc. The air-interface configuration may comprise IS-95, CDMA2000 1xRTT, CMDA2000 1xEV-DO, the evolution of CDMA2000 air interfaces, or other configuration types.

One or more resource pools may reside on the same carrier. On the other hand, a resource pool may consist of multiple carriers. These alternate configurations are illustrated in FIGS. 5A and 5B, respectively. Thus, for example, FIG. 5A diagrams the resource pool configuration with multiple available carriers 502, while FIG. 5B diagrams a carrier having multiple available resource pools 504.

During operation, a mobile station may utilize one or more resource pools at any particular instance. Layer 2/3 performs fast and dynamic management of the physical layer resource, defined as the set of resource pools, to meet upper layer service requirements and resource availability at each pool. In one embodiment, the resource availability of each pool is dynamically affected by the loading and the forward link channel condition experienced by the mobile station at the particular pool.

Table I below tabulates one specific implementation/configuration of the resource pools in the forward link of a multi-carrier wireless network. As described above, the information included in each resource pool is selected from among carrier supported, transmission mode, manageable resources, and service characteristics (e.g., QoS).

TABLE I

| | Resource Pool 1 | Resource Pool 2 | Resource Pool 3 | Resource Pool 4 |
|---|---|---|---|---|
| Carrier # | #1 - Primary Carrier | #1 - Primary Carrier | #2- Supplemental Carrier | #3- Supplemental Carrier |
| Transmission mode | 1xRTT backward compatible | 1xRTT backward compatible | Non 1xRTT backward compatible; new physical layer with adaptive modulation and coding, OFDM, MIMO, etc.) | Non 1xRTT backward compatible; new physical layer with adaptive modulation and coding, OFDM, MIMO, etc.) |
| Manageable resource | Walsh codes, forward power | Walsh codes, forward power | Time slots | Time slots |
| Service characteristics | Real-time voice service | Real-time data service | Delay tolerant data service | Delay tolerant data service |

Scheduling

Implementation of the invention provides several dynamic management options for the physical layer resource at the base station. Among these are: (1) each user (i.e., mobile device) may have access to both dedicated channel(s) and shared channel(s). These channels may be power controlled or rate controlled; (2) for each packet being transmitted, layer 2/3 decides to which pool or pools the packet should be sent, based on call setup service configuration and based on the packet's QoS priority; (3) the scheduler may actively manage the QoS priority for packets waiting in the scheduler's transmission queues, and a packet originally assigned for shared channel transmission may be switched over for dedicated channel transmission, if the packet has been waiting for too long or if the shared channel cannot meet the packet's QoS requirement; and (4) the layer 2/3 scheduler decides which packet should be sent.

The decision making process of option 4 above is completed utilizing data related to one or more parameters including: (a) time-to-live (applicable for pseudo-real-time service only); (b) user's relative priority (applicable for deployment scenario where "absolute" QoS is not defined); (c) guaranteed minimum average data rate; (d) channel condition feedback from the mobile station; and (e) capacity cost of each radio frequency (RF) channel. The invention contemplates that additional parameters may be utilized in the decision making process and presentation of the specific parameters above is not meant to be limiting on the invention.

Finally, although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A base station system to implement an air interface protocol architecture for a multi-carrier wireless communications network having a plurality of carriers, said architecture comprising a common layer 2 and layer 3 protocol for the carriers, wherein the common layer 2 and layer 3 protocol provides a common interface with wireline upper level protocols; and the base station system comprises a base station transceiver subsystem (BTS) that provides a multimode physical layer of the architecture for each of the carriers, wherein the physical layer of each carrier is configurable to a different protocol configuration for each mobile station serviced by the carrier,
    wherein the physical layer includes one or more resource pools, and
    wherein each resource pool includes a plurality of characteristics selected from among:
    a quality of service (QoS) supported;
    a list of manageable resources;
    a carrier identification; and
    an air interface configuration.

2. The base station system of claim 1, wherein said QoS includes characteristics from among data rate, packet loss rate, and service type.

3. The base station system of claim 1, wherein said list of manageable resources include time slots, spreading codes, power, modulation, and coding set.

4. The base station system of claim 1, wherein a layer 2 protocol of the common layer 2 and layer 3 protocol includes:
    one or more Radio Link Protocols (RLP) instances; and
    one or more Medium Access Control (MAC) sublayer instances.

5. The base station system of claim 1, wherein at least one of said resource pools comprises multiple carriers.

6. The base station system of claim 1, further comprising a base station controller to provide the common layer 2 and layer 3 protocol.

7. The base station system of claim 1, wherein the base station system is according to a code division multiple access (CDMA) protocol.

8. A base station system to implement an air interface protocol architecture for a multi-carrier wireless communications network, said base station system comprising:
    a base station controller to implement a centralized layer 2 and layer 3 protocol;
    a base station transceiver subsystem to implement a distributed layer 2 and layer 3 protocol;
    the base station transceiver subsystem having a modem to implement a plurality of physical layer configurations, wherein said plurality of physical layer configurations include a plurality of resource pools; and
    a control manager to perform call admission and quasi-static, time-of-day management of characteristics and boundaries of each resource pool,
    wherein each resource pool includes a plurality of characteristics selected from among:
    a quality of service (QoS) supported;
    a list of manageable resources;
    a carrier identification; and
    an air interface configuration.

9. The base station system of claim 8, wherein said QoS includes characteristics from among data rate, packet loss rate, and service type.

10. The base station system of claim 8, wherein said list of manageable resources include time slots, spreading codes, power, modulation, and coding set.

11. The base station system of claim 8, wherein a layer 2 protocol of the common layer 2 and layer 3 protocol includes:
    one or more Radio Link Protocols (RLP) instances; and
    one or more Medium Access Control (MAC) sublayer instances.

12. The base station system of claim 11, wherein the RLP is a QoS Link Protocol.

13. The base station system of claim 8, wherein at least one of said resource pools comprises multiple carriers.

14. A base station within a multi-carrier wireless communication network that has multiple carriers, said base station comprising:
    an air interface protocol architecture that includes:
        a common layer 2 and layer 3 protocol for each of the carriers, wherein the common layer 2 and layer 3 protocol provides a common interface with wireline upper level protocols;
        a multimode physical layer for each of the carriers, wherein the physical layer of each carrier is configurable to a different protocol configuration for each mobile station serviced by the carrier and includes a plurality of resource pools, wherein each of the resource pools includes a quality of service (QoS) supported, wherein each resource pool further includes at least an additional characteristic from among:
        a list of manageable resources;
        a carrier identification: and
        an air interface configuration; and
        a control manager to perform call admission and quasi-static, time-of-day management of characteristics and boundaries of each resource pool.

15. The base station of claim 14, wherein a layer 2 protocol of the common layer 2 and layer 3 protocol includes:
    one or more Radio Link Protocols (RLP) instances; and
    one or more Medium Access Control (MAC) sublayer instances.

16. The base station of claim 15, wherein the RLP is a QoS Link Protocol.

17. A system for providing flexible, service-driven carrier assignment and resource allocation in a multi-carrier wireless communications network, said system comprising:
    a service driven air interface protocol architecture having a common layer 2 and 3 that supports different physical layer modes of operation at different time instants for different mobile device types; and
    control means for implementing said protocol architecture to route packets over said network,
    wherein said air interface protocol architecture comprises:

a common layer 2 and layer 3 protocol for each of the carriers, wherein the common layer 2 and layer 3 protocol provides a common interface with wireline upper level protocols; and a multimode physical layer for each of the carriers, wherein the physical layer of each carrier is configurable to a different protocol configuration for each mobile station serviced by the carrier and include a plurality of resource pools, wherein each resource pool includes a plurality of characteristics selected from among:

a quality of service (QoS) supported;

a list of manageable resources;

a carrier identification; and an air interface configuration.

18. The system of claim 17, wherein a layer 2 protocol of the common layer 2 and layer 3 protocol includes:

one or more Radio Link Protocols (RLP) instances; and one or more Medium Access Control (MAC) sublayer instances.

19. The system of claim 18, wherein the RLP is a QoS Link Protocol.

20. The system of claim 17, wherein said control means includes a centralized resource control manager.

21. The system of claim 17, wherein said control means includes a MAC state machine for each terminal.

22. The system of claim 21, wherein said air interface protocol architecture is configured with MAC sub-layer having a data plane that provides dynamic multiplexing and de-multiplexing of layer 2 frames from one or more terminals to and from physical layer frames.

23. The system of claim 17, wherein said control means includes means for determining which packets to send out to the network, wherein a decision is made based on one or more factors from among: time to live; user's relative priority; guaranteed minimum average data rate; channel condition feedback from the mobile station; and capacity cost of each radio frequency channel.

24. The system of claim 17, further comprising means for selecting appropriate physical level resources, wherein said physical level resources are selected in both frequency and time domain to meet a Quality of Service (QoS) requirement.

25. A base station system to implement an air interface protocol architecture for a wireless communications network having a plurality of carriers, the architecture comprising a common layer 2 and layer 3 protocol for the carriers, wherein the common layer 2 and layer 3 protocol provides a common interface with an upper level protocol, the base station system including a base station transceiver subsystem (BTS) that has a multimode physical layer including the plurality of carriers, wherein the carriers are configurable to different protocol configurations, wherein each of the protocol configurations includes a quality of service (QoS) supported, wherein the multimode physical layer has plural resource pools, wherein each of the plural resource pools is defined based on a plurality of parameters, one of the plurality of parameters being the corresponding QoS supported, and wherein another one of the plurality of parameters is selected from among:

a list of manageable resources;

a carrier identification; and an air-interface configuration.

26. The base station system of claim 25, wherein the base station system is according to a code division multiple access (CDMA) protocol.

* * * * *